Inventor
HERMAN G. BLEVINS.
By Richey & Watts
Attorney

Fig. 12

Inventor
HERMAN G. BLEVINS.
By Richey & Watts
Attorney

Patented Nov. 27, 1934

1,982,415

UNITED STATES PATENT OFFICE 1,982,415

METHOD AND APPARATUS FOR ELECTRICALLY WELDING PIPE

Herman G. Blevins, Sewickley, Pa., assignor to Republic Steel Corporation, a corporation of New Jersey Application July 15, 1931, Serial No. 550,906
Renewed April 26, 1934

31 Claims. (Cl. 219—6)

This invention relates to a method and apparatus for making welded pipe by the electric resistance method. It relates more particularly to the continuous manufacture of large size, heavy walled pipe at relatively high speeds.

Although the manufacture of pipe of comparatively small diameter and of relatively thin gauge material by continuous processes employing electric resistance methods of welding has been used widely commercially, this method has not been employed in producing heavy gauge, large diameter pipe until recently because of numerous obstacles hereinafter referred to somewhat in detail, that heretofore prevented the adaptation of that method to the manufacture of this heavy gauge large diameter pipe. These obstacles first had to be overcome in order that a practical, commercial, heavy gauge, large diameter pipe mill could be devised as is disclosed in the co-pending application of William M. Neckerman, Serial No. 549,590, filed July 9, 1931, on Method and appartus for making electrically welded pipe, wherein the invention specifically set forth in this application is broadly claimed.

In the prior practice of welding tubing by electric resistance methods the material commercially welded was thin gauge strip steel having a maximum thickness of about .125 inches and a maximum diameter of about four inches. In welding this tubing the amount of current necessary was relatively small as compared with the amount required for the heavy pipe; the contact area between the electrodes and the stock being welded was correspondingly small.

Furthermore, due to the fact that the amount of current was relatively small the pressure exerted by the electrodes on the pipe passing through the welding throat was correspondingly small. Moreover in this practice the stock entered the welding throat under more or less favorable welding conditions with regard to the open seam and the abutting edges thereof, the stock being in the form of reels of strip steel, and the ends of the successive reels joined together thus permitting of a continuous and uninterrupted welding operation. The formed blank was either drawn through the welding machine under tension or propelled therethrough by the rolls of the forming machine.

With pipe, however, where the wall thickness may amount to $\frac{1}{8}$ of an inch or more and the diameter may be 16 inches or more, the current required for welding may exceed 130,000 amperes, the pressure exerted by the electrodes is tremendous because the area of contact must be correspondingly large to keep the unit current density within operative limits and the pipe which must be made in separate lengths presents a problem by reason of the possible chipping of the electrodes by the entering end of the pipe. These and other problems have been commercially solved by the aforesaid application, by this invention and by other inventions on which applications are being or have recently been filed.

This invention contemplates the use of lengths of flat rolled ferrous metal having a thickness from .125 inches upwardly and, when formed, a diameter from about four inches upwardly. Hence the stock from which the finished pipe is constructed initially takes the form of a flat blank. These pipes are formed into substantially cylindrical or tubular shape proper for welding in the welding machine. Furthermore, the edges of the seam after the pipe blank has been ejected from the forming mill must be squared and aligned prior to the introduction thereof into the welding throat. This is effected by propelling the pipe through stands of line-up rolls prior to the introduction thereof into the welding throat, wherein the edges of the seam are cold worked against the sides of a fin which projects from the central portion of the upper roll of the line-up roll stands.

Another important feature of this invention is the provision of means to prevent chipping of the electrode rolls when each successive length of formed pipe is introduced into the welding throat. The means herein shown for accomplishing this purpose includes a roll disposed slightly beyond or forwardly of the vertical center line of the electrodes and so positioned as to move the blank into a heavy pressure contact with the electrodes after the leading end of the blank has passed beyond the vertical center line of the electrodes. The pressure rolls are further designed so as to properly align and present the seam of the pipe blank to the electrodes in proper position for welding. Further all weaving of the seam due to the fact that the pipe was formed from cambered plate will be compensated for thereby.

Another feature of this invention is the provision of an area of contact between the electrode rolls and the walls of the pipe being welded sufficiently great to maintain the density of the current per unit of area within limits where burning of the electrodes or pipe or other damage or injury is avoided. It has been found that with the enormous current necessary to weld the heavy material herein used, a small contact area between the pipe and the electrode would not transmit sufficient current to effect the weld. To get sufficient area, therefore, between the electrode and the pipe being welded, and to properly transmit the required amounts of current, an enormous pressure is exerted through the electrodes on the pipe to slightly deform the metal of the pipe to the contour of the electrodes.

A further feature of this invention is that the seam of the formed blank is presented to the electrodes of the welding throat at a definite predetermined angle of closure during the welding of a tube blank. This objective is effective through the medium of feed-in rolls and a set of internal rolls disposed directly ahead of the welding throat. The seam is positively closed in the second set of rolls of the feed-in roll stand and then opened a predetermined distance by a set of internal rolls disposed between the feed-in roll stand and the electrodes. This feature assures that a perfect weld will result.

In actual practice an open seam tubular blank is received from the forming machine and is properly aligned with the open seam upper-most. The blank is then propelled into two stands of line-up rolls where the blank is held against rotation and twisting by suitable devices which are embodied in the top roll of each of the stands of line-up rolls. From the line-up rolls the blank passes through a stand of feed-in rolls comprising two pairs of vertically disposed rolls. The upper roll of the first pair has a member against which the edges of the seam are cold worked to square up these edges. In the second set of rolls of the feed-in roll stand the seam is closed and the edges thereof worked against each other, the opening between these latter rolls being slightly less than the opening of the preceding set of rolls. Upon leaving the stand of feed-in rolls the closed seam is opened a predetermined distance by a pair of internal rolls disposed within the pipe in advance of the electrodes. These rolls maintain a definite angle of closure of the seam as the tube enters the welding throat. Upon entering the welding throat the pipe is first engaged by the side rolls of the pressure stand. These rolls float on their shafts and as the pipe progresses and engages the bottom roll of the pressure roll stand, ride upwardly with the pipe as the bottom roll brings the pipe into positive contact with the electrodes. This feature avoids the chipping of the electrodes by the incoming end of the pipe. The excessive pressure which is exerted between the electrodes and the bottom roll of the pressure roll stand causes the electrodes to deform the wall of the pipe and effect the desired area of contact between the electrodes and the wall of the tube.

Simultaneously with the closing of the seam and the exertion of the pressure through the pressure rolls, current is supplied to the electrodes and, in passing across the seam, welds the abutting edges thereof. As the welded pipe passes from the welding throat the flash of the welded seam is rolled down by the rolls of the planishing unit which immediately follows the electrodes. From the planishing unit the welded pipe is next engaged by a series of stands of sizing rolls wherein all deformities in the welded pipe are ironed out and when passing therefrom is in the form of a perfect cylinder.

Other objects and advantageous features more or less ancillary to the foregoing and the manner in which all the various objects are realized will appear in the following description, which, considered in conjunction with the accompanying drawings, sets forth the preferred form of the invention and wherein:

Figures 1, 2:
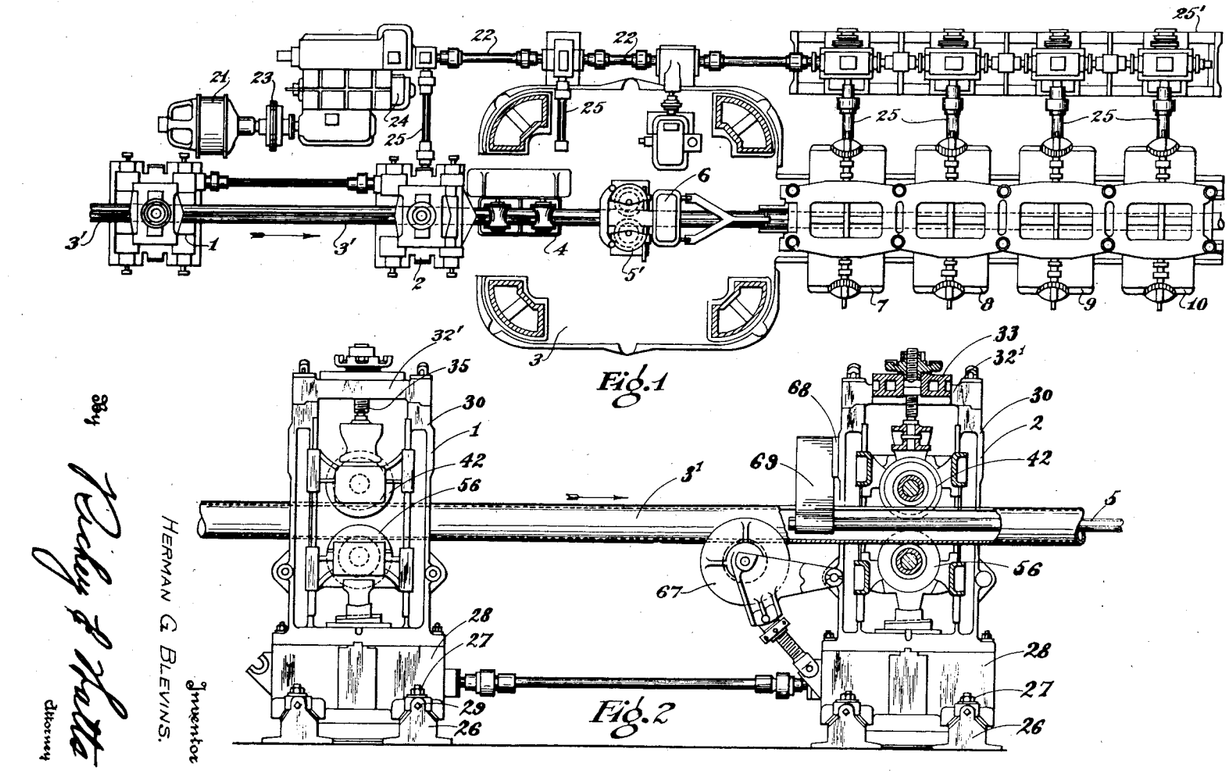
Figure 1 is a diagrammatic view, partly in section showing the drive mechanism, line-up rolls and sizing rolls of the welding apparatus.
Figure 2 is a side elevation partly in section of the line-up rolls.

Referring now to Figure 1, the apparatus as a whole includes line-up roll stands 1 and 2 for receiving an open seam pipe 3' from a conveyor table (not shown) to which it has been delivered by the forming machine. The function of the line-up roll stands 1 and 2 is to align the pipe axially with its seam upper-most and maintain it from twisting prior to its introduction into the welding throat of a welder indicated generally at 3. The welder 3 includes a stand of feed-in rolls 4 which receives the open seamed pipe from the line-up rolls 1 and 2 and engages it frictionally to advance it through the remaining stages of the welding operation. A mandrel 5 (Figure 3) is disposed within the tube 3' and is supported from the housing of the line-up roll stand 2 by a plate 69 which extends through the longitudinal cleft of the open seam pipe. The purpose of this mandrel will be referred to hereinafter more in detail. A pressure roll stand 5' is provided for forcing together the abutting edges of the open seam of the pipe 3' at the point of contact of the electrode rolls therewith. The planishing roll stand 6 (Figure 3) is disposed immediately following the welding throat and is adapted to roll down or planish the metal which has become extruded on the exterior and interior of the welded pipe during the welding process. Four stands of sizing rolls 7, 8, 9 and 10 are provided to size the welded pipe to a perfect cylindrical shape, thereby removing any distortion from the pipe which might have been introduced by non-uniform heating of the pipe or pressure of the electrodes thereon during the welding process.

With reference now to Figure 1, there is shown diagrammatically a motor 21 co-operating through a magnetic clutch 23 with speed reducing gearing 24. A series of driving units 25' are connected to the reduction gearing 24 through spindles 22. The drive units through spindles 25 are adapted to drive the line-up rolls, feed-in rolls, planishing rolls and sizing rolls.

The stands of feed-in rolls 1 and 2 (Figures 2, 3 and 5) are identical as to construction and comprise a bed plate 26 secured to a suitable foundation by bolts 27 which carries a base 28 adapted to partake of lateral adjustment through the provision of adjusting screws 29. Side frames 30 and 31 are bolted to the base 28 and are provided with suitable guides 32 in the opposing sides therof. A yoke 33 connects the crossheads 32' of the side frames 30 and 31, which yoke member 33 has a central enlargement 34 bored and internally threaded to receive a screw 35, the lower ends of which are rigidly secured to a second yoke member 36, the outer arms of the yoke member 36 are adapted to have formed thereon the bearing housings 37 and 38, the latter having projections thereon which engage the guides 32 of the roll housing. These bearing housings 37 and 38 are provided with suitable bearings in which are journalled the opposite ends of a shaft 39 upon which is keyed a line-up roll 40. The line-up roll 40 comprises a pair of conical end bells 41 oppositely disposed and a central disc 42 which when assembled on the shaft 40 between suitable clamping nuts 43 form the completed roll. The periphery of the disc 42 is adapted to enter the seam cleft in the formed pipe.

Figure 3:
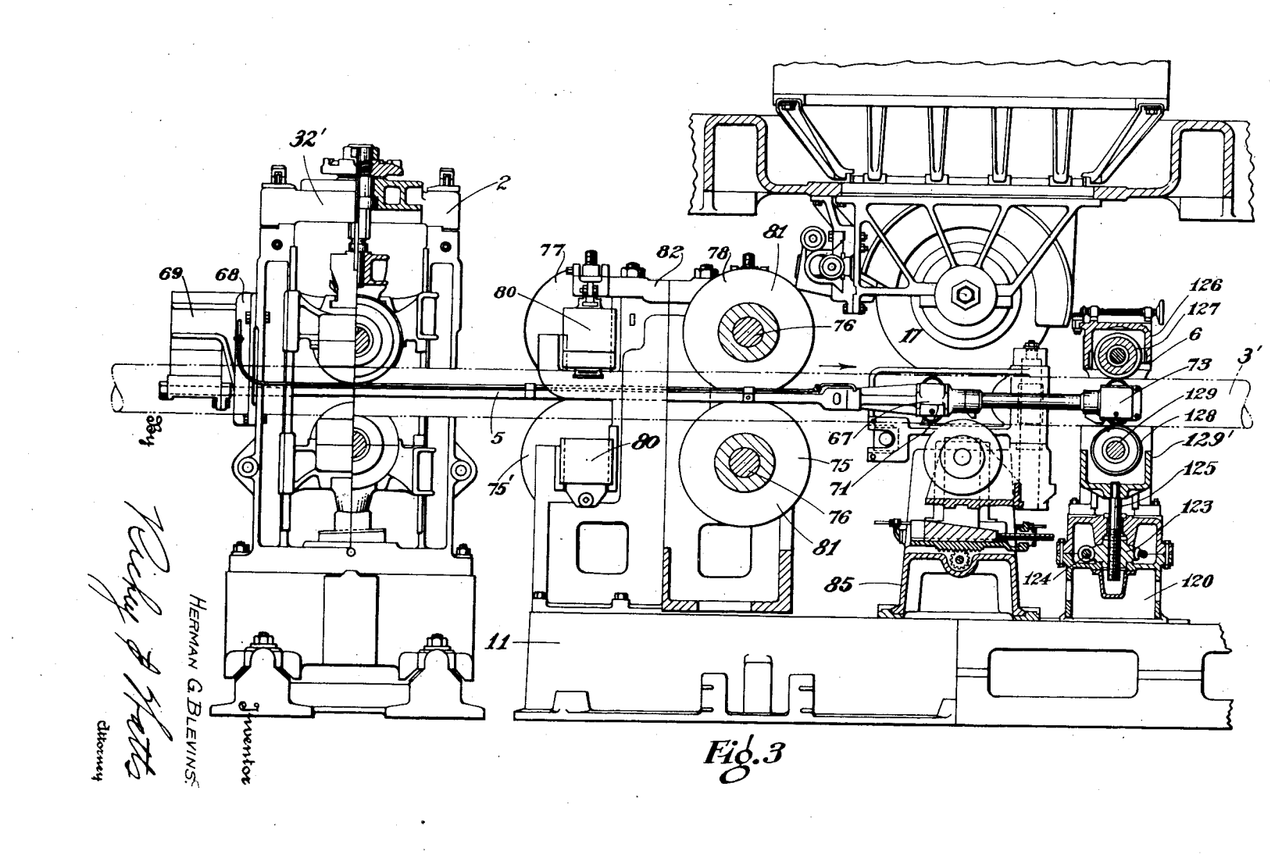
Figure 3 is a fragmentary enlarged view partly in section of a portion of the welding apparatus.
Figure 5:
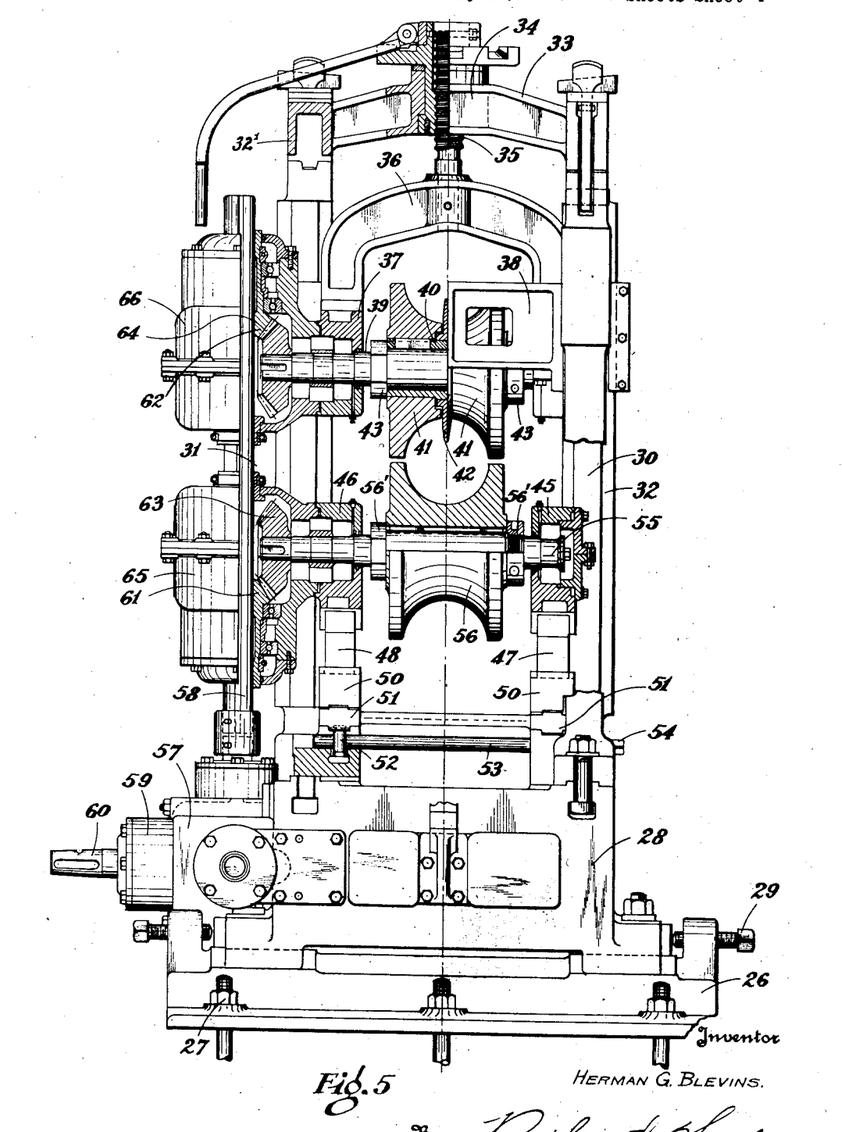
Figure 5 is a front elevation partly in section of one of the stands of line-up rolls.

The bearing housings 45 and 46 are supported upon blocks 47 and 48 and are retained within the side guides 32 of the frame members being adapted to vertical adjustment. The blocks 47 and 48 are supported by wedge members 50 carried in the side frame 30 and 31. The wedge members 50 are slidable on the frames and the racks 51 and pinions 52 afford means for assisting the wedge members to raise or lower the bearing housings 45 and 46. The pinions 52 are provided and keyed to a shaft 53, the latter being provided with a squared end 54 for the reception of a wrench to effect rotation thereof.

The bearing housings 45 and 46 are adapted to support the opposite ends of a shaft 55 upon which is keyed a roll 56. The roll 56 is adjustable on the shaft 55 and is held in suitable designated position by collars 56' adjacent each side thereof. The base 28 is provided with a bearing housing 57 within which one end of a vertical shaft 58 is journalled. The bearing housing 57 is also provided with a second bearing housing 59 within which is journalled a driving spindle 60, which is driven by the motor 21 (Figure 1) through the connection hereinbefore mentioned. The shaft 60 is in driving connection with the shaft 58 to effect rotary motion to the latter. The shaft 58 has keyed thereto in spaced relation a pair of beveled gears 61 and 62. The lower gear 61 meshes with a gear 63 disposed on the outer end of the shaft 55 to effect rotative movement to the roll 56, the latter being keyed to the shaft 55. The upper gear 62 meshes with a gear 64 which is keyed to the shaft 39 and effects a correspondingly rotative movement to the roll 40. The gears 63 and 61 are journalled in a suitable bearing housing 65, similarly the gear 63 and 64 are encased in the housing 66. The rolls 40 and 56 are thus driven by the main drive through the connection hereinbefore described.

Both the upper and lower rolls of the guide roll stands 1 and 2 may be adjusted vertically and the rolls themselves may be changed to accommodate different sizes of pipe.

The disc 42 of the top rolls of each of the stands of line up rolls 1 and 2 are identical. The discs in the top rolls of the line-up roll stands serve to hold the seam of the pipe open until the pipe has passed the plate 69 which supports the mandrel 5, and also serve to hold the pipe blank from twisting or weaving prior to entrance thereof into the feed-in rolls. While passing through the line-up rolls the edges of the open seam are cold worked against the discs 42 by being pressed against opposite sides of the disc to prepare the abutting edges of the seam prior to its introduction into the welding throat of the welding machine.

As is shown in Figure 2 the guide roll stand 2 is provided with an auxiliary guide roll 67 which provides for accurately directing the entering end of the pipe between the rolls of the stand 2. By using two guide roll stands 1 and 2 the entering pipe is firmly held against torsional strains which might tend to throw the pipe out of alignment and prevent proper adjustment of the seam edge with respect to the electrode rolls.

The guide roll stand 2 is provided with brackets 68 to which is secured the plate 69. Adjacent the lower edge of the plate 69 is secured the outer end of the mandrel 5. The mandrel 5 carries two sets of internal rolls 67 and 73 (Figure 3). The first set of rolls 67 is carried in the roll case 71 and is adapted to open the seam of the pipe after it has been closed in the feed-in rolls and maintain a definite angle of approach of the seam to the electrode rolls 17 and 18. The second set of internal rolls carried by the mandrel 5 are shown at 73 and constitute part of the planishing unit which will be described in detail later.

Figure 6:
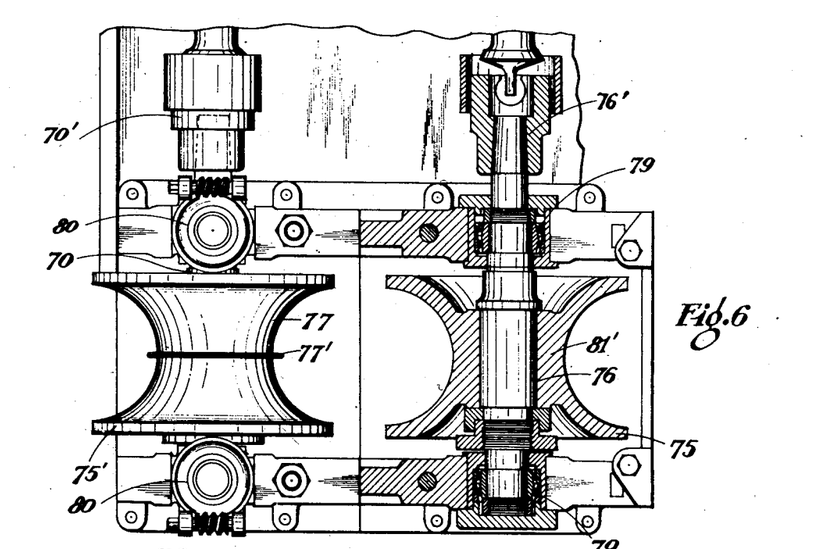
Figure 6 is a fragmentary top plan view, partly in section of the feed-in rolls.

With reference to Figures 3 and 6 of the drawings there is disclosed a stand of feed-in rolls which are supported on the base 11 of the welding unit. This stand of rolls is disposed between the stand of line-up rolls 2 and the welding throat of the welding machine, and are adapted to receive the pipe from the former and prepare it prior to the time it enters the welding throat. The feed-in roll stand 4 comprises two sets of vertically disposed rolls 75 and 75'. The set of rolls 75' comprises an upper roll 77 carrying a fin 77' against which the edges of the open seam are cold worked in passing therethrough by being forced against opposite sides of the fin. The rolls of the stand 75' are supported on a pair of horizontal shafts 70, the opposite ends of which are journalled in suitable bearing boxes 80. One end of each of the shafts 70 has secured thereto a coupling 70' which secures the shaft 70 to spindles 25 whereby rotative movement is imparted to the rolls of this set of rolls. The second set of rolls of the feed-in roll stand 4 comprises two rolls 81 and 81'. These rolls are disposed on a pair of horizontal shafts 76 which are suitably journalled in bearing boxes 79 adjacent each end thereof and carried by the roll housing. Similarly one end of the shafts 76 have secured thereto a coupling member 76' which is adapted to receive one end of a spindle 25 which is adapted to effect a driving torque to this set of rolls. The diameter of the opening between the rolls 81 and 81' is somewhat less than between the rolls of the stand 75' so that the edges of the seam are brought into abutting relation when passing therethrough and are cold worked against each other to square up these edges prior to the entrance of the seam into the welding throat.

Referring now to Figures 3, 8, 9 and 10 of the drawings there is disclosed a stand of pressure rolls disposed directly below the electrode rolls 17 and 18, which comprises a base 85 including a recess 86 in which a carriage 87 is adjustable longitudinally of the moving pipe. The carriage is gibbed to the base casting 88 and is provided with guides 89 in which a supporting roll housing 90 may be shifted vertically. The housing 90 supports a horizontal shaft 91' upon which is mounted the roll 91. The housing rests on a block 92 which is in turn supported on a wedge 93 in the bottom of the carriage 87.

The carriage 87 may be shifted as a whole longitudinally of the base casting by means of a rack 94 (Figure 8) on its bottom and a pinion 95 journalled in the base. The wedge 93 can also be adjusted to lower and raise the housing 90 by means of a screw 96 which co-operates with a nut 97 secured to the projection 98 on the bottom of the carriage 87.

Figure 8:
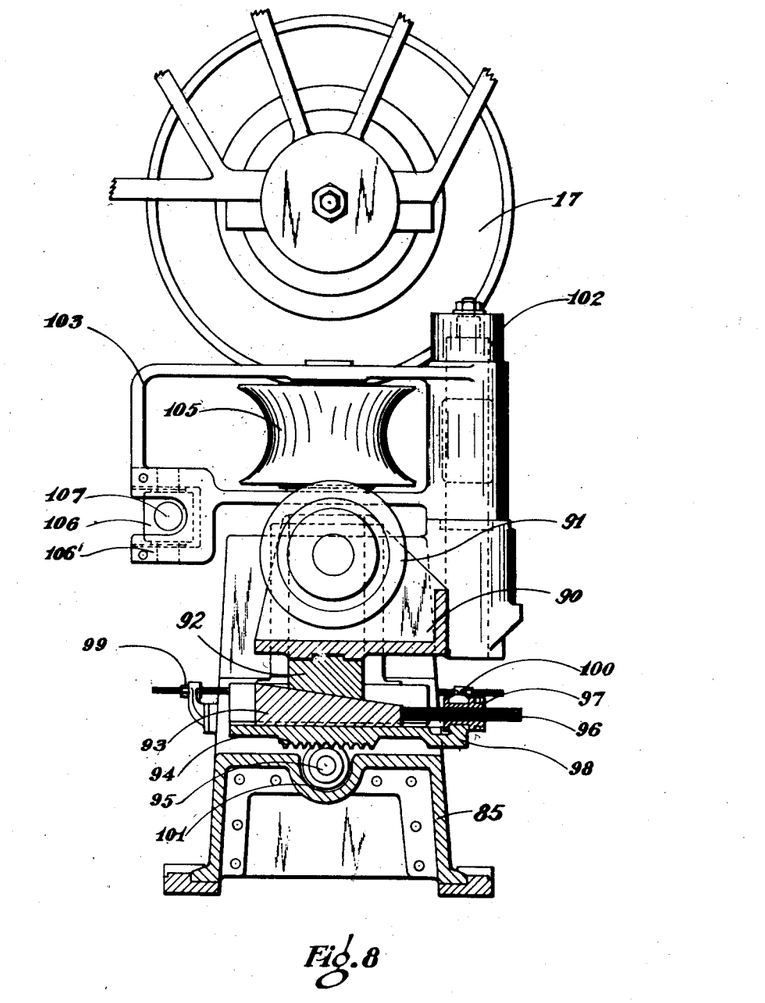
Figure 8 is a side elevation, partly in section illustrating the pressure rolls disposed in co-operative relation to the electrode rolls.
Figure 9:
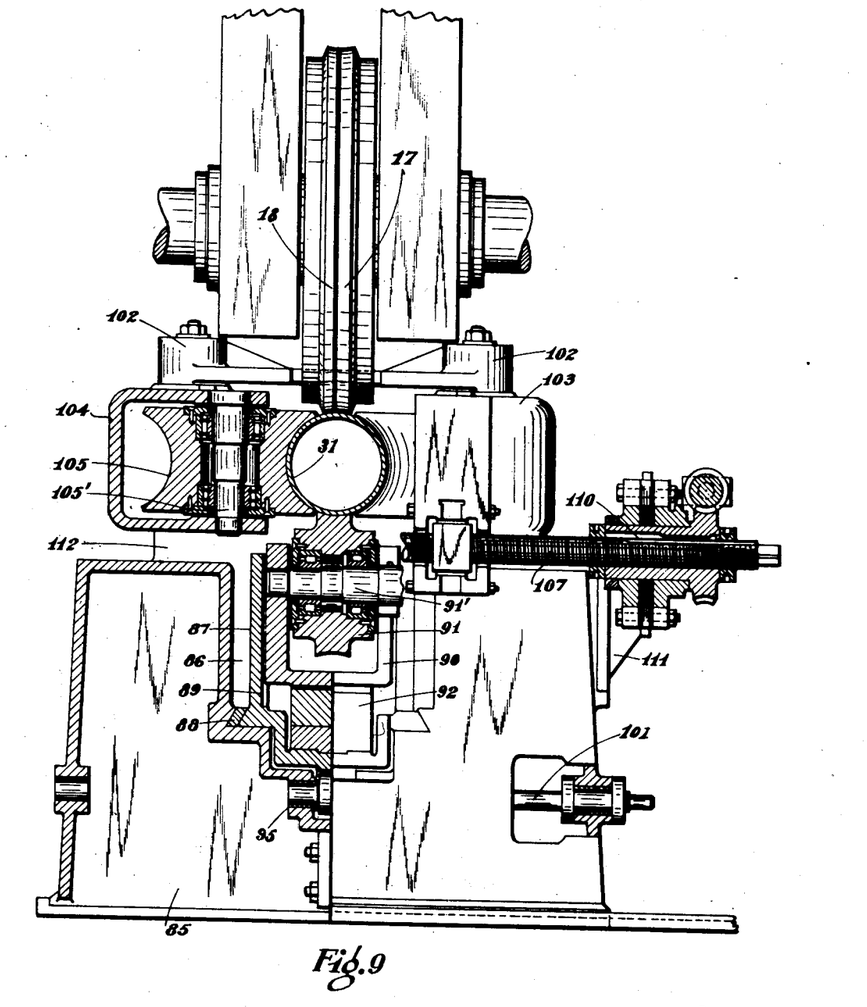
Figure 9 is a front sectional elevation of the view shown in Figure 8.
Figure 10:
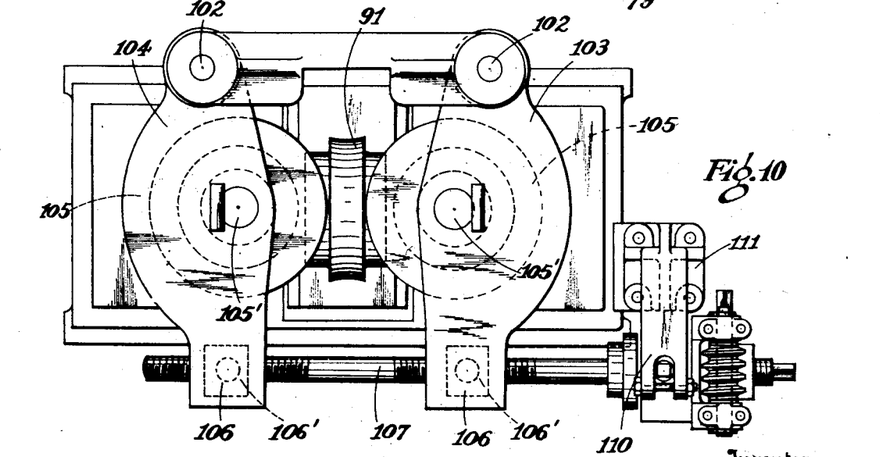
Figure 10 is a top plan view of the pressure roll stand shown in Figures 8 and 9.

Clamping screws 99 and 100 on the base casting secure the carriage 87 firmly in any position to which it is adjusted by rotating a shaft 101 upon which the pinion 95 is keyed. During the welding operation the supporting roll of the pressure roll stand is so adjusted as to be set forward of the center line of the electrode rolls so that the leading end of the blank passes said center line before the pipe engages the roll 91. Upon further movement of the pipe through the welding throat the pipe rides upon the roll 91 and welding pressure is exerted upon the blank between this roll and the electrode rolls. This procedure will avoid any chipping of the electrode rolls by contact of the incoming end of the pipe with the electrodes.

The base casting supports pins 102 extending vertically upward therefrom. The pressure roll housings 103 and 104 are pivoted on the pins 102 and have journal bearings for the reception of the shafts 105' carrying the side pressure rolls 105. The bearings upon which the side pressure rolls 105 are journalled are so formed that the rolls 105 float on the shafts 105'. The free movement of these rolls relative to the longitudinal axis of the shaft upon which they are mounted will compensate for any misalignment of the seam with the electrode rolls due to imperfectly formed pipe. The bottom supporting roll 91 is also adapted to float on the shaft 91' upon which it is mounted. On the free ends of the housings 103 and 104 are the projections 106' which are adapted to receive a trunnion nut 106 secured thereto. The nuts 106 co-operate with right and left hand threads formed on the screw shaft 107. One end of the shaft 107 is journalled in a bearing 110 supported on an arm 11 bolted to the base 85.

The housings 103 and 104 rest squarely on the flat upper surface of the casting 85 as shown at 112 and are adapted to slide thereacross when the shaft 107 is rotated. Rotation of the shaft 107, of course, causes the housing to advance toward or depart from the axis of the pipe 3' passing between the rolls.

Supporting roll 91 and side pressure rolls 105 may be removed and replaced by other rolls when it is desired to handle different size pipe.

Figure 11:
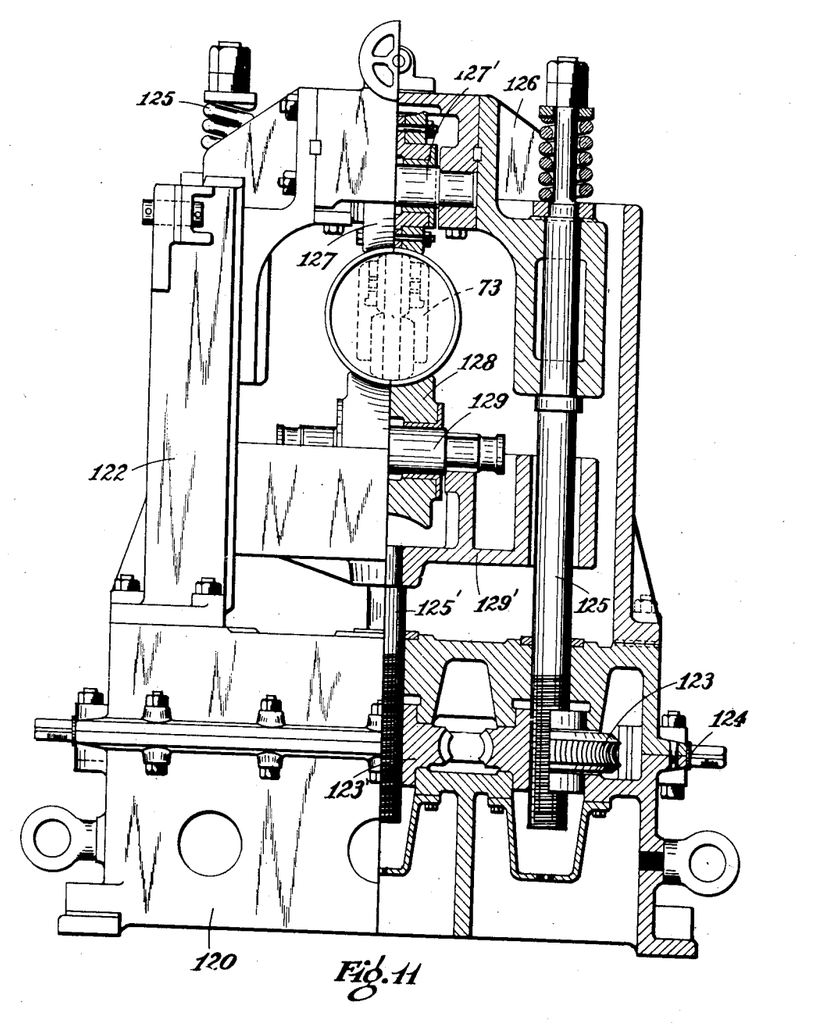
Figure 11 is a front elevation, partly in section of the planishing unit.

The planishing roll stand 6 shown in Figures 3 and 11 is located directly forward of the stand of pressure rolls 5 and comprises a base 120 supported on the base 11 of the welding unit and having a frame 122 secured thereto. In the base 120 a pair of worm wheels 123 and the worm wheel 123' are journalled. The worm wheels 123 and 123' may be actuated by a worm shaft 124. The worm wheels 123 are bored out axially and threaded internally to co-operate with the threaded lower parts of threaded posts 125. A crosshead 126 is pinned to the post 125 and a roller 127 is journalled on a shaft 127' carried thereby, for co-operation with the seam on the outer wall of the pipe 3' as will be apparent from this figure. Supporting roll 128 is carried by a shaft 129 suitably journalled in a vertical movable carriage member 129'. Vertical movement of this carriage is effected through the rotation of post 125' which has a threaded portion engaging the worm wheel 129'. The worm wheel is rotated through rotation of the shaft 124.

Figure 12:
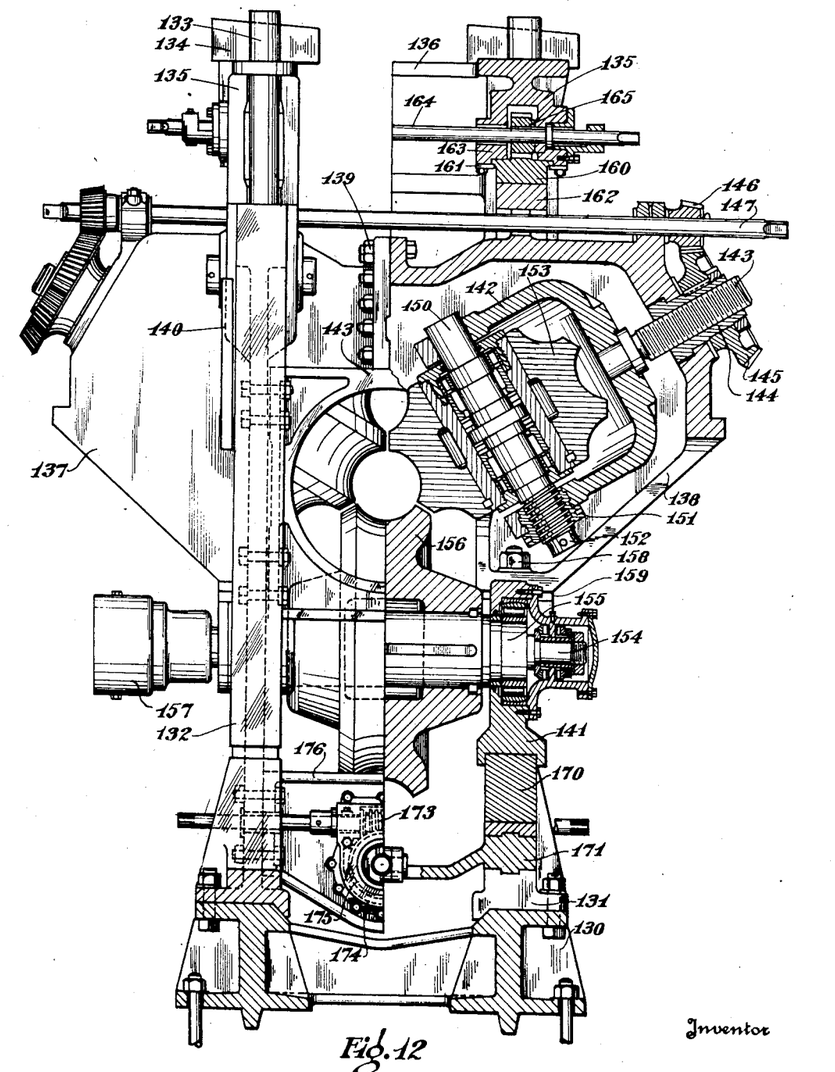
Figure 12 is a front elevation, partly in section of one of the stands of sizing rolls which immediately follows the welding unit.

The sizing and straightening roll stands 7, 8, 9 and 10 (Figure 1) are identical in construction. An enlarged view of one of these stands is illustrated in Figure 12 and comprises a base plate 130 having a base 131 mounted thereon. Four columns 132 rise from the four corners of the base 131, the upper ends of the columns 132 are provided with sockets for the reception of the posts 133. The posts 133 are pinned to the columns 132 by pins 134. Side plates 135 connect the posts 133 in the adjacent columns, and cross braces 136 connect opposite posts. The roll frames 137 and 138 are bolted together at 139 and are adapted to slide vertically in the columns 132 which are provided with guides 140. A supporting roll housing 141 is likewise slidable in the vertical guides 140. A yoke 143 is bolted between columns 132 laterally of the machine. Each of the roll frames 137 and 138 is provided with a roll housing 142. The housing has guide ribs which co-act with the vertical guides 140 of the frame. The housing is adapted to be moved in the guides by a screw 143 which transverses an internally threaded bushing 144. The bushing 144 is rotatably mounted in a frame 138 and is keyed to a bevel gear 145 which may be rotated by bevel pinion 146 on a shaft 147. Corresponding mechanism permits the simultaneous adjustment of the roll housing in the frame 137. The shaft 147 is provided with squared ends for receiving a wrench for effecting the rotation thereof.

Each roll housing 142 carries a roll shaft 150, the lower end of which is threaded into a bushing 151 fixed to the housing. A shaft may be turned in the bushing by means of a spanner, and a lock nut 152 provides means for securing the shaft in adjusted position. A roll 153 is rotatably mounted on the shaft 150.

The supporting roll housing 141 is provided with journalled bearings 154 for a roll shaft 155. A roll 156 is carried thereby and a coupling 157 is provided for connecting the roll shaft to suitable driving means.

The frames 137 and 138 are bolted to the housing by bolts 158 which transverse a spacing shim 159. As previously stated the frame housings may be adjusted vertically on the columns 132. But when once adjusted, the frames and housings are rigidly connected. Spacing shims of different thickness may be provided for the different positions occupied by the frame and housing.

The mechanism for adjusting the vertical positions on the frames 137 and 138 comprises a pair of wedges 160 carried by the side plates 135 and slidable in guides 161. The wedges 160 co-operate with inclined surfaces 162 on top of the frames 137 and 138. The wedges are provided with racks 163. A transverse shaft 164 journalled in the side plates 135 carry pinions 165 meshing with the rack 163. The ends of the shaft 164 are squared and by rotating the shaft by means of a wrench or other suitable means the wedges 160 may be caused to shift the frames 137 and 138 in the guides 140.

Similar adjusting means is provided for the supporting roll 156. The housing 141 rests on blocks 170. The blocks 170 are supported on wedges 171 which are slidable on the base 131. A screw 173 is connected to the wedges 171 and is adapted to be actuated by a worm wheel 174 having a threaded bore which is journalled in a housing 175 secured to a transverse web 176 of the base 131. Raising the housing 141 will likewise raise the frames 137 and 138, the wedges 160 are drawn back to permit such movement of the frame. When the frames and housing have been adjusted the wedges 170 are drawn tight to prevent upward displacement of the rolls 153 by means of the pipe while passing therethrough.

A very rigid connection of the setting of the sizing rolls is thus provided, while the rolls may be readily adjusted so that a considerable flexibility may be obtained. Any individual set of sizing rolls may be adjusted without altering the setting of the other rolls, to correct any irregularity observed in the pipe turned out by the machine. The sizing rolls 153 can be withdrawn independently of the support rolls 156.

Figure 4:
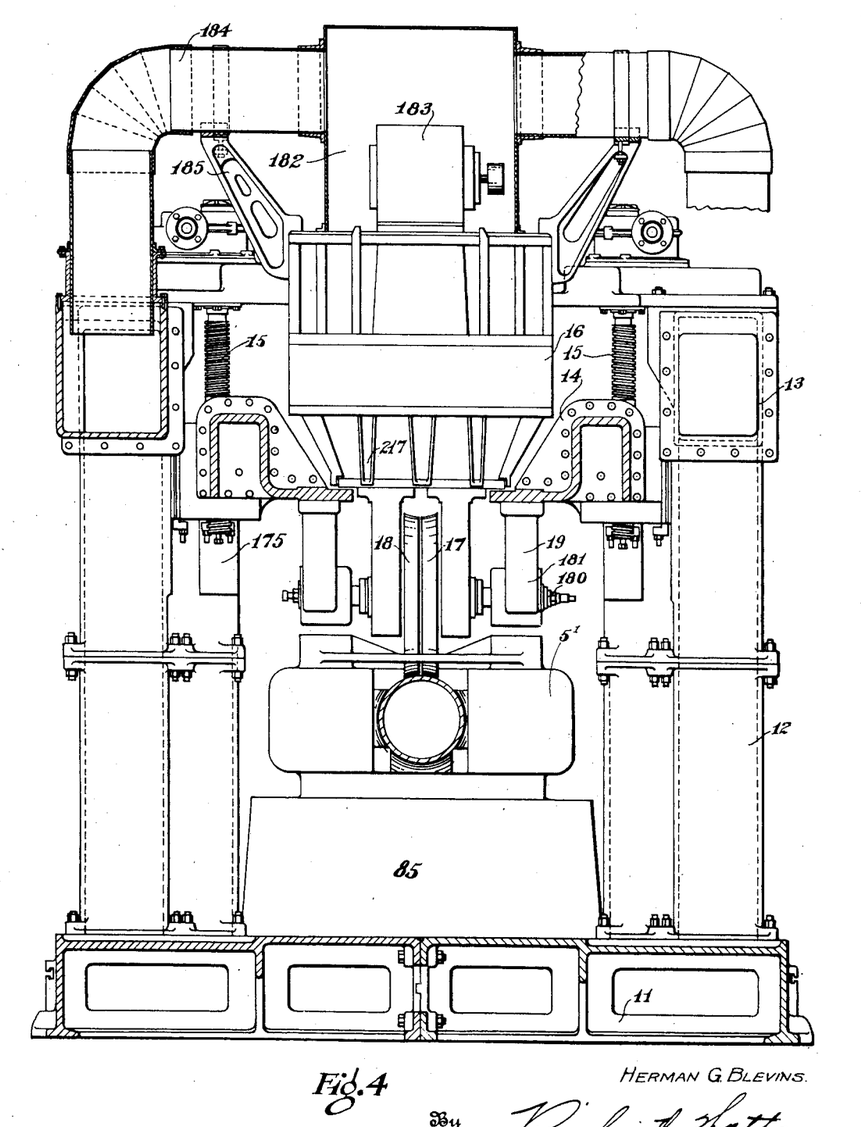
Figure 4 is a front elevation of the welding unit.
Figure 7:
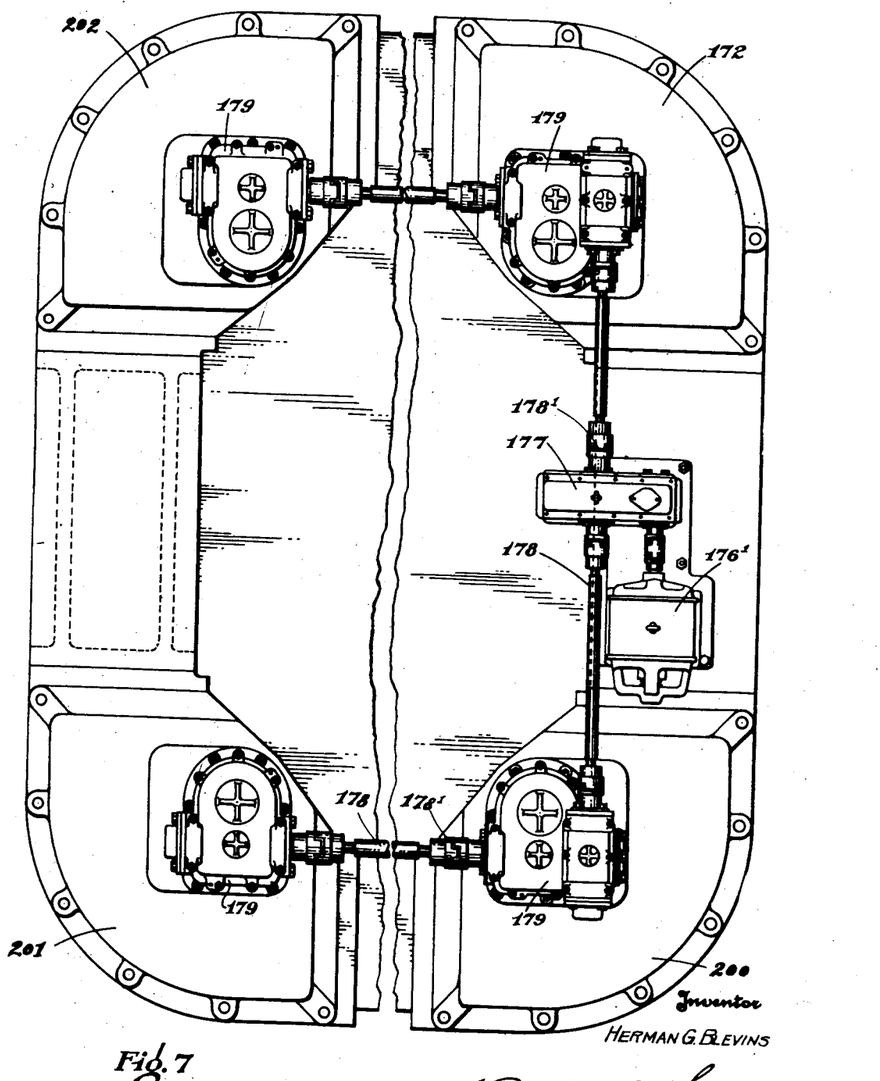
Figure 7 is a top plan view illustrating the drive mechanism for raising and lowering the transformer and supports for the electrodes.

Referring now to Figures 4 and 7 the welder shown diagrammatically in Figure 1 comprises the base 11 from the corners of which columns 12 extend upwardly. Adjacent the upper end, the columns 12 are connected by crossheads 13. The columns 12 carry the heads 172, 200, 201 and 202. Guides 175 are formed on the inner angle of the columns. Screws 15 are journalled in the heads 172, 200, 201 and 202. The carriage 14 is supported on such screws between the guides 175. The mechanism for raising and lowering the carriage 14 comprises a motor 176' mounted on one of the crossheads 13. Through reduction gearing 177 and shaft 178 and coupling 178' the motor 176' drives four double worm reduction gears 179 which actuate the screws 15. The transformer 16 is supported on the carriage 14 and the electrode rolls 17 and 18 are suspended from the carriage. The transformer 16 is supported from the carriage by the legs 217 and the rolls 17 and 18 rotate on a shaft 180 supported in bearings 181 carried by the brackets 19.

The vertical adjustability of the transformer carriage 14 permits the electrode pressure to be adjusted to the desired amount. The screws 15 and the driving connection therefor are designed to give a very fine control of the carriage position.

The transformer 16 is surrounded by a housing 182 which encloses a suction fan 183. The fan draws cool air through a filter (not shown) up through the hollow columns 12 and thrugh the ducts 184 extending from the columns to the housing. The ducts have a sliding fit to permit the conveyor mechanism for the cooling medium to be raised and lowered with the transformer. Brackets 185 afford auxiliary supports for the ducts 184.

As has been hereinabove stated, in the welding of heavy gauge large diameter pipe involving the use of large amounts of current, it is necessary to provide greater than a line contact between the electrodes and the pipe. The area of contact between the electrodes and the pipe which has been found preferable to use is approximately one square inch of electrode per each 40,000 amperes of current or less.

In following out the above set forth invention, the pipe is adapted to be received by the line-up rolls 1 and 2 from a suitable seam line-up mechanism. The open seam of the pipe is engaged by the discs 42 of the upper rolls of each line-up unit. While in these rolls the edges of the seam of the pipe is worked against this fin to provide parallel surfaces on the abutting edges of the seam of the pipe. From the line-up rolls the pipe passes to the first set of vertically disposed rolls of the feed-in roll stand, the upper roll 77 of this set of vertically disposed rolls having a fin which engages the cleft of the pipe blank. Upon further movement of the pipe blank it is engaged by the second set of rolls of this stand. These rolls are adapted to positively close the open seam of the pipe. From here the pipes moves into the welding throat, and the seam is first engaged by a set of internal rolls 71 which open the seam, previously closed in the feed-in rolls, a predetermined amount. The pipe is next engaged by the side rolls of the pressure roll stand which positively closes the seam, and simultaneously therewith the seam is brought into contact with the electrodes. To avoid any chipping of the electrodes by the end of the incoming pipe, the bottom supporting roll is set forward of the center line of the electrodes. As the pipe engages this latter roll it moves upwardly; the floating of the side rolls of the pressure roll stand permitting this upward movement. While under the electrodes the pipe is distorted thereby to provide a sufficient area of contact between the pipe and the electrodes due to the enormous pressure exerted by the electrodes, and further to effect a perfect weld.

When the electrodes 17 and 18 are in engaging relation with the pipe electric current is supplied to the former and welding of the abutting edges of the pipe takes place. The pipe continues its movement through the welding throat of the welding unit and is next engaged by a planishing unit, wherein the metal which has been extruded during the welding of the abutting edges of the pipe is rolled down or planished.

After the pipe has passed through the planishing unit it is adapted to pass through four sets of sizing rolls wherein any discrepancies in the pipe is corrected due to the uneven heating of the pipe by the electrodes or the deformation thereof by the enormous pressure exerted thereon. Upon the discharge of the pipe from the sizing or finishing rolls the blank has been formed and welded into a perfect cylindrical shape.

From the preceding description, it will be apparent that the invention provides for manufacturing large size heavy wall pipe by the electric resistance welding method with a maximum of speed and efficiency and a minimum expense in handling. And, although the foregoing description is necessarily of a detailed character in order to completely set forth the invention it is to be understood that the specific terminology is not intended to be restrictive and confining and it is to be further understood that various re-arrangements of parts and modifications of structural detail may be resorted to without departing from the scope or spirit of the invention as defined in the following claims.

I claim:

1. Apparatus for butt welding comprising means for feeding a tubular ferrous metal blank having a longitudinal open seam into a welding throat, means for applying pressure at a point in advance of the welding throat to move the edges of the seam into contact with each other, means intermediate said first point and the welding throat to apply internal pressure to the tube to space the seam edges apart a predetermined distance, pressure rolls for applying pressure to the tubular blank at the welding throat to force the edges into substantial contact with welding pressure, and means for electric resistance welding together the abutting edges of the tubular blank.

2. Apparatus for butt welding comprising means for feeding a ferrous metal having a longitudinal open seam into a welding throat, means for applying pressure at a point in advance of the welding throat to move the edges of the blank into contact with each other, means disposed within said tubular blank and intermediate the electrodes and seam closing means adapted to space the edges a predetermined distance, pressure rolls for applying pressure to the tubular blank at the welding throat, and means for welding the abutting edges of the tubular blank.

3. Apparatus for butt welding comprising means for feeding a tubular ferrous metal blank having a longitudinal open seam into a welding throat, means including rolls for applying pressure to the outside walls of the tube at the welding throat, said pressure rolls being so arranged as to float on their shafts.

4. Apparatus for butt welding comprising means for feeding a heavy walled tubular ferrous metal blank having a longitudinal open seam into a welding throat, means including rolls for exerting a pressure on the outside wall of said tubular blank at the welding throat, said rolls adapted to partake of free vertical movement, and a supporting roll disposed below and adapted to coöperate with said rolls in engaging the tubular blank.

5. Apparatus for butt welding comprising means for feeding a ferrous metal blank having a longitudinal open seam into a welding throat, means for welding the abutting edges of the tubular blank, means including rolls for applying a pressure to the outer walls of the tubular blank through a vertical plane coincident with the center line of the electrodes, and means comprising a roll for counteracting the downward pressure of said welding means, the center line of said roll being disposed forward of the vertical plane through the axis of the electrodes.

6. Apparatus for butt welding comprising means for feeding a tubular ferrous metal blank having a longitudinal open seam into a welding throat, electrode rolls for welding together the seam edges of the tubular blank, pressure rolls to move the seam edges into contact with each other, a mandrel supported within said tubular blank, and means carried by said mandrel intermediate said closing means and said electrode rolls for maintaining a definite angle of approach of the seam edges to the electrode rolls.

7. Apparatus for butt welding comprising means for feeding the tubular ferrous metal blank having a longitudinal open seam into a welding throat, pressure rolls to move the seam edges into contact with each other before entering the welding throat, a mandrel disposed within said blank, means carried by said mandrel intermediate said closing means and said electrode rolls for maintaining a definite angle of approach of the seam edges to said welding throat, means including electrode rolls for supplying welding current to said seam edges and for welding the same together, and a second means carried by said mandrel for removing the internal burr from the welded seam.

8. Apparatus for butt welding comprising means for feeding a tubular ferrous metal blank having a longitudinal open seam into a welding throat, pressure rolls to move the seam edges into contact with each other, means intermediate said rolls and the welding throat adapted to maintain a definite angle of approach of the seam edges into the welding throat, pressure rolls disposed at said welding throat to close the abutting edges against each other, and electrodes adapted to supply current to the abutting edges simultaneously with the application of pressure on the part of the side pressure rolls.

9. An apparatus for welding the open seam of a tubular ferrous metal blank including means for advancing said tubular blank, a pair of electrodes engaging with said tubular blank on opposite sides of the seam to be welded, means for applying pressure to the walls of the blank to cause the seam edges to abut with welding pressure, said means being so arranged as to move vertically with the blank as the blank is brought into welding engagement with the electrodes.

10. An apparatus for welding the open seam of a tubular ferrous metal blank including means for advancing said tubular blank, a pair of electrodes engaging with said tubular blank on opposite sides of the seam to be welded, means for applying pressure to the walls of the blank to cause the seam edges to abut with welding pressure, said means being so arranged as to move with the tubular blank to compensate for any misalignment of the seam with respect to the said electrodes.

11. An apparatus for welding the open seam of a tubular ferrous metal blank including means for advancing said tubular blank, a pair of electrodes engaging with said tubular blank on opposite sides of the seam to be welded, means for applying pressure to the walls of the blank to cause the seam edges to abut with welding pressure, said means including rolls mounted for free vertical movement on their longitudinal axis.

12. In an apparatus for welding the longitudinal seam of a tubular ferrous metal blank, a welding throat including a pair of electrodes adapted to engage the tubular blank on opposite sides of the seam, means for closing said seam, means at the entrance end of the welding throat for advancing the tubular blank into the welding throat out of welding contact with the electrodes and means disposed forward of a vertical line through the center of the electrodes and on a different plane than that of the blank advancing means for causing welding pressure to be exerted by the electrodes on the tubular blank.

13. In an apparatus for welding the longitudinal seam of a tubular ferrous metal blank, a welding throat including a pair of electrodes adapted to engage the tubular blank on opposite sides of the seam, and means for closing the seam, said means comprising opposed rolls mounted for free vertical movement on their axis.

14. In an apparatus for welding the longitudinal seam of a tubular ferrous metal blank, a welding throat including a pair of electrodes adapted to engage the tubular blank on opposite sides of the seam, means including rolls for closing the seam, and a supporting roll for resisting the downward pressure of the electrodes, said rolls being mounted for free axial movement.

15. In an apparatus for welding the longitudinal seam of a tubular ferrous metal blank, a welding throat including a pair of electrodes adapted to engage the tubular blank on opposite sides of the seam, means including opposed rolls mounted for free axial movement for closing the seam, and means disposed forward of a vertical plane through the center line of the electrodes and the seam closing rolls for causing said electrodes to exert a pressure on the tubular blank to effect the transmissal of welding current thereto.

16. In an apparatus for welding the longitudinal seam of a tubular ferrous metal blank, a welding throat including a pair of electrodes adapted to engage the tubular blank on opposite sides of the seam, means on one side of the vertical center line of the electrodes for positioning the tubular blank out of welding contact with but close to the electrodes, and means on the other side of the vertical center line of the electrodes and on a different plane than that of the first said means for bringing the blank into contact with the electrodes with welding pressure.

17. In an apparatus for electrically butt welding the open seam of a tubular ferrous metal blank, a welding throat including means for welding the abutting edges of the tubular blank and means for applying pressure to the outer walls of the tubular blank in a vertical line substantially in line with the center line of the electrodes to close the seam of the blank, means on one side of the welding throat for advancing the blank in a straight line out of welding contact with but close to the electrodes, and means spaced beyond the electrodes for moving the pipe out of said line of travel and into contact with the electrodes with welding pressure, the center line of said last mentioned means being beyond said vertical line.

18. In an apparatus for welding the longitudinal seam of the tubular ferrous metal blank, a pair of electrodes disposed in fixed position and adapted to engage the blank on opposite sides of the seam, means on one side of the vertical center line of the electrodes for positioning the tubular blank out of welding contact with the electrodes and means on the other side of the vertical center line of the electrodes for moving the pipe relative to the electrodes and into contact therewith with welding pressure.

19. The method of butt welding the longitudinal seam of a tubular ferrous metal blank which consists in advancing the blank longitudinally past the electrodes of a welding machine, bringing the seam edges of the tubular blank into abutting relation, moving the pipe blank relative to the electrodes to bring the seam edges into welding contact with the electrodes and welding the seam.

20. The method of butt welding the longitudinal seam of a tubular ferrous metal blank which consists in advancing the leading end of such a blank longitudinally past the electrodes in one plane, bringing the seam edges of the blank into abutting contact with each other, moving the tube from said plane of travel and into welding contact with the electrodes, and electric resistance butt welding the seam of the tubular blank.

21. The method of making metal pipe which includes the steps of propelling a ferrous metal pipe blank having a longitudinal seam into a welding throat while preventing metal chipping contact of the leading end of the blank with the electrodes of the throat, moving the blank into contact with the electrodes immediately after the leading end of the blank has passed the vertical center line of the electrodes, and welding the seam edges together by passing welding current across the seam and exerting welding pressure on the blank while the edges are at welding temperature.

22. The method of making metal pipe which includes the steps of propelling the leading end of a ferrous metal pipe blank having a longitudinal seam into a welding throat and to a point beyond the center line of electrodes in the throat while preventing metal chipping contact of such end with the electrodes, then forcing the blank against the electrodes and the edges against each other with welding pressure, and welding the seam by propelling the blank thru the throat while passing welding current across the seam.

23. The method of making metal pipe which includes the steps of forming ferrous metal into a pipe blank having a longitudinally extending seam, cold working the edges of the seam to shape them for welding and welding the seam edges together progressively therealong by passing welding current across the seam while the seam edges are pressed together with welding pressure.

24. The method of making metal pipe which includes the steps of forming ferrous metal into a pipe blank having a longitudinally extending seam, cold-working the edges of the seam by pressing them with metal working pressure against means disposed therebetween, and welding the worked seam edges together progressively therealong by passing welding current across the seam while the seam edges are pressed together with welding contact.

25. The method of making metal pipe which includes the steps of forming ferrous metal into a pipe blank having a longitudinally extending seam, cold-working the edges of the seam by pressing the seam edges against each other with metal working pressure, and welding the worked seam edges together progressively therealong by passing welding current across the seam while the seam edges are pressed together with welding pressure.

26. The method of making metal pipe which includes the steps of cold working the seam edges of a ferrous metal pipe blank having a longitudinally extending seam to shape the seam edges for welding and then welding the seam edges together by passing welding current across the seam and pressing the seam edges together with welding pressure.

27. The method of making metal pipe which includes the steps of cold-working the seam edges of a ferrous metal pipe blank having a longitudinally extending seam, by pressing such edges with cold metal working pressure against means disposed therebetween, and then welding the seam edges together by passing welding current across the seam and pressing the edges together with welding pressure.

28. The method of making metal pipe which includes the steps of cold-working the seam edges of a ferrous metal pipe blank having a longitudinally extending seam, by pressing such edges against each other with cold metal working pressure, and then welding the seam edges together by passing welding current across the seam and pressing the edges together with welding pressure.

29. Apparatus for making metal pipe which includes means for feeding lengthwise a ferrous metal pipe blank having a longitudinally extending seam, means including a member engageable with the seam edges for cold-working said edges, electrodes constituting part of a welding throat for progressively passing welding current across the seam and applying welding pressure to the blank while the seam edges are at welding temperature.

30. Apparatus for making metal pipe which includes means for propelling lengthwise an elongated ferrous metal pipe blank having a longitudinal seam, means including pressure applying members engageable with the exterior of the pipe for progressively cold-working the seam edges against each other, and welding means including rotary electrodes constituting part of a welding throat for passing welding current across the cold worked and abutted seam edges and pressing the edges together with welding pressure while at welding temperature.

31. Apparatus for making metal pipe which includes means for propelling lengthwise a ferrous metal pipe blank having a longitudinally extending seam, means for cold working the opposed edges of the seam, said means including a member engageable with the seam edges and members engageable with the exterior of the blank to cause the seam edges to bear with cold working pressure on the said member, and a welding throat including means engageable with the exterior of the blank for passing welding current across the seam and pressing the seam edges together with welding pressure while at welding temperature.

HERMAN G. BLEVINS.

DISCLAIMER 1,982,415.—*Herman G. Blevins*, Sewickley, Pa. METHOD AND APPARATUS FOR ELECTRICALLY WELDING PIPE. Patent dated November 27, 1934. Disclaimer filed June 8, 1938, by the assignee, *Republic Steel Corporation*.
Hereby disclaims from said patent claims 26 and 28.
[*Official Gazette July 5, 1938.*]